United States Patent Office 2,912,067
Patented Nov. 10, 1959

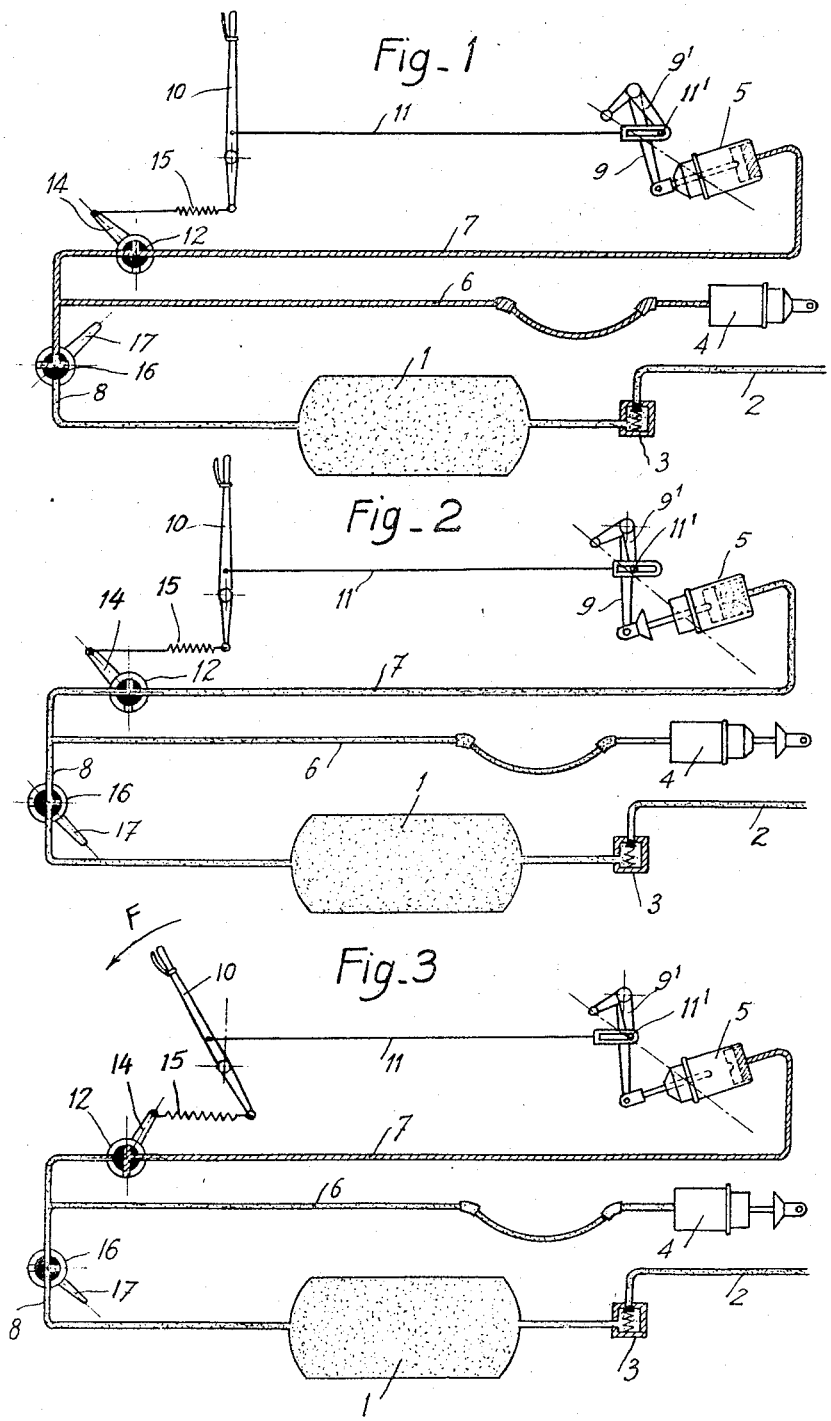

2,912,067

SAFETY BRAKING APPARATUS FOR ROAD TRACTORS AND TOWING LORRIES

Lucien Peras, Billancourt, France, assignor to Regie Nationale des Usines Renault, Billancourt, France Application October 9, 1956, Serial No. 614,844

Claims priority, application France October 31, 1955

3 Claims. (Cl. 188—3)

The invention relates to a safety braking apparatus for road tractors and towing lorries.

Road laws oblige that road tractors and towing lorries have a safety braking arrangement which is to act upon a minimum percentage of the weight of the assembly formed by the towing vehicle and the towed vehicle.

Now this braking action cannot be carried out solely on the axle or axles of the towed vehicle, and the rear axle of the towing vehicle must in every case be braked at the same time.

In these conditions, it is no longer possible to use the usual brake on this rear axle of the towing vehicle, since, in the event of the hand brake and the safety brake being operated simultaneously, the said axle could be subjected to strains for which it was not designed. The same remark could also apply to the part of the brake-gear common to the two brake systems.

In order to obviate this disadvantage, the invention proposes a safety apparatus comprising an arrangement for putting the safety brake out of circuit as soon as the hand brake acting normally on the rear wheels of the towing vehicle is operated.

A fluid under pressure can be used to actuate the safety brake. In the following description, reference will be made to a safety brake installation using compressed air.

In the accompanying drawings:

Fig. 1 is a diagrammatic view of the safety brake installation on the towing vehicle in the position where the brakes are not applied;

Fig. 2 is a view similar to Fig. 1, the safety brake being in operation;

Fig. 3 is again a view similar to Fig. 1, showing the arrangement of the braking members when the towing vehicle is braked directly by the hand brake.

Referring now to the drawing, it will be seen that the safety brake installation comprises a compressed air reservoir 1, which is supplied through the general pipe 2 carrying compressed air to the installation, the said pipe comprising a check valve 3 which stops the flow of air into the reservoir when the pressure in the latter reaches a predetermined value. The reservoir 1 is in communication with the brake cylinders 4 and 5 respectively by way of the pipes 6 and 7 which are branched from the pipe 8 communicating with the reservoir 1. A brake cylinder 4 acts on the brakes of the towed vehicle (not shown), whilst the brake cylinder 5 acts on the arm 9 controlling the compensator of the rear brakes of the towing vehicle. The arm $9^1$ of the brake-gear can be controlled directly by a hand brake lever 10 of the towing vehicle by means of the rod 11 with a slide engaging with a pin $11^1$ of the arm $9^1$ of the brake-gear. A three-way cock 12 is arranged in the pipe 7 and is under the control of the hand brake lever 10 by way of the arm 14 and the elastic connection 15. A three-way cock 16 arranged in the pipe 8 before the branch pipe 6 is controlled by the lever 17 situated on the floor within reach of the driver.

The safety brake operates as follows:

In the position of the members illustrated in Fig. 1, corresponding to non-braking, the three-way cock 16 causes the cylinders 5 and 4 to communicate with the atmosphere and isolates the reservoir 1. The cock 12 is operable to cause the cylinder 5 to communicate with the cylinder 4 and cock 16.

In the position illustrated in Fig. 2, the cock 16 causes the compressed air reservoir 1 to communicate through the pipe 8 with the branch pipes 6 and 7, causing the fluid under pressure to act upon the brake cylinders 4 and 5, (cutting them off from the atmosphere) and, consequently, the safety brake acts on the towed vehicle and on the rear axle of the towing vehicle. However, in the case of the brake cylinder 5 the fluid under pressure is fed by way of the shut-off cock 12.

Fig. 3 shows the brake members in the position corresponding to safety braking by means of only the hand brake lever of the towing vehicle. In this case, the movement of the lever 10 in the direction of the arrow F causes the rotation of the cock 12, by means of the elastic connection 15 and arm 14, bringing the cock into the position in which it allows the brake cylinder 5 to communicate with the atmosphere, interrupting communication between pipe 8 and pipe 7.

The compressed air safety brake therefore no longer acts on the rear axle of the towing vehicle, whilst it continues to act on the towed vehicle. Therefore it is impossible to subject the rear axle of the towing vehicle to the joint force of the hand brake and the safety brake together.

I claim:

1. In a braking system, the combination of braking apparatus for braking a tractor vehicle and braking apparatus for braking a trailer towed by the tractor vehicle, fluid operated means for simultaneously braking the tractor and trailer comprising, a source of fluid pressure, a first fluid pressure actuated means for operating only the tractor vehicle rear-wheel braking apparatus, a second fluid pressure actuated means for operating the trailer braking apparatus, conduit means providing communication between said fluid pressure source and said first and second pressure actuated means, means for selectively allowing fluid pressure to be applied simultaneously to said first and second fluid pressure actuated means thereby to simultaneously operate the tractor and trailer braking apparatus, and a mechanical hand brake mechanism to selectively operate the tractor rear-wheel braking apparatus and for simultaneously rendering the first pressure actuated means ineffective to operate the tractor rear-wheel braking apparatus while the second pressure actuated means is effective to operate the trailer braking apparatus.

2. In a braking system, the combination of braking apparatus for braking a tractor vehicle and braking apparatus for braking a trailer towed by the tractor vehicle, air operated means for simultaneously braking the tractor and trailer comprising, a storage receptacle for storing air under pressure, a first air pressure actuated member for operating only the tractor vehicle rear-wheel braking apparatus, a second air pressure actuated member for operating the trailer braking apparatus, conduit means providing communication between said air storage receptacle and said first and second pressure actuated members, means for selectively allowing air pressure to be applied simultaneously to said first and second air pressure actuated members thereby to simultaneously operate the tractor and trailer braking apparatus, and a mechanical hand brake mechanism to selectively operate the tractor rear-wheel braking apparatus and for simultaneously rendering the first pressure actuated member ineffective to operate the tractor rear-wheel braking apparatus while the second pressure actuated member is effective to operate the trailer braking apparatus.

3. In a braking system, the combination of braking apparatus for braking a tractor vehicle and braking apparatus for braking a trailer towed by the tractor vehicle, air operated means for simultaneously braking the tractor and trailer comprising, a storage receptacle for storing air under pressure, a first air pressure actuated member for operating only the tractor vehicle rear-wheel braking apparatus, a second air pressure actuated member for operating the trailer braking apparatus, conduit means providing communication between said fluid pressure source and said first and second pressure actuated members, a first cock connected in said conduit means selectively operable to a position isolating only the first air pressure actuated member from said air storage receptacle and simultaneously allowing it to communicate with the atmosphere, means comprising a second cock for selectively and simultaneously allowing air pressure to be applied to said first and second fluid pressure actuated members simultaneously thereby to simultaneously operate the tractor and trailer braking apparatus, and a mechanical hand brake mechanism to selectively operate the tractor rear-wheel braking apparatus and for simultaneously operating the first cock to said position thereby rendering the first pressure actuated member ineffective to operate the tractor rear-wheel braking apparatus while the second pressure actuated member is effective to operate the trailer braking apparatus.

References Cited in the file of this patent

UNITED STATES PATENTS

| | | |
|---|---|---|
| 2,019,292 | Campbell | Oct. 29, 1935 |
| 2,155,030 | Wilkins | Apr. 18, 1939 |
| 2,578,388 | Ambler | Dec. 11, 1951 |

FOREIGN PATENTS

| | | |
|---|---|---|
| 696,395 | Germany | Sept. 20, 1940 |
| 524,972 | Great Britain | Aug. 19, 1940 |